(12) United States Patent
Rivet

(10) Patent No.: US 10,253,702 B2
(45) Date of Patent: Apr. 9, 2019

(54) CONTROL METHOD AND SYSTEM FOR INTERNAL COMBUSTION ENGINE

(71) Applicant: Darren Rivet, Edmonton (CA)

(72) Inventor: Darren Rivet, Edmonton (CA)

( * ) Notice: Subject to any disclaimer, the term of this patent is extended or adjusted under 35 U.S.C. 154(b) by 0 days.

(21) Appl. No.: 13/969,110

(22) Filed: Aug. 16, 2013

(65) Prior Publication Data

US 2014/0048040 A1 Feb. 20, 2014

Related U.S. Application Data

(60) Provisional application No. 61/684,368, filed on Aug. 17, 2012.

(51) Int. Cl.

| | |
|---|---|
| *F02D 17/04* | (2006.01) |
| *F02D 41/02* | (2006.01) |
| *F02D 45/00* | (2006.01) |
| *F02D 9/02* | (2006.01) |
| *F02D 41/04* | (2006.01) |
| *F02D 41/00* | (2006.01) |
| F02D 41/26 | (2006.01) |

(52) U.S. Cl.
CPC ............... *F02D 17/04* (2013.01); *F02D 9/02* (2013.01); *F02D 41/0002* (2013.01); *F02D 41/021* (2013.01); *F02D 41/042* (2013.01); *F02D 45/00* (2013.01); *F02D 41/266* (2013.01); *F02D 2200/60* (2013.01); *F02D 2200/701* (2013.01); *Y02T 10/42* (2013.01)

(58) Field of Classification Search
CPC ...... F02D 45/00; F02D 17/04; F02D 41/0002; F02D 41/021; F02D 41/042; F02D 9/02; F02D 41/266; F02D 2200/60; F02D 2200/701

USPC .... 123/434, 198 D, 198 F; 251/294, 327, 74
See application file for complete search history.

(56) References Cited

U.S. PATENT DOCUMENTS

| | | | |
|---|---|---|---|
| 4,381,100 | A | 4/1983 | Schoenberg |
| 4,422,418 | A * | 12/1983 | Dorn ........................ 123/198 D |
| 4,501,238 | A | 2/1985 | Odum |
| 4,537,386 | A | 8/1985 | Krepela et al. |
| 4,546,954 | A | 10/1985 | Bodnar |
| 5,003,943 | A | 4/1991 | Lafferty |
| 5,050,548 | A | 9/1991 | Minigishi |
| 5,203,536 | A | 4/1993 | Krepela |
| 5,205,252 | A | 4/1993 | Krepela |
| 5,653,207 | A | 8/1997 | Denton |
| 5,729,619 | A * | 3/1998 | Puma .................. B60K 28/063 |
| | | | 382/115 |
| 5,873,343 | A | 2/1999 | Denton |
| 5,999,876 | A * | 12/1999 | Irons .................... F02D 41/042 |
| | | | 701/115 |

(Continued)

FOREIGN PATENT DOCUMENTS

CA 2299929 9/2001

*Primary Examiner* — Mahmoud Gimie
(74) *Attorney, Agent, or Firm* — Bennett Jones LLP

(57) ABSTRACT

The invention relates to a control method and system for an internal combustion engine incorporating an engine shut-off valve, and in particular an air intake shut-off valve for a diesel or gas-fueled engine. The control system comprises a valve controller unit including a receiver capable of receiving sensor signals, and being in communication with the shut-off valve for permitting or preventing air flow in the shut-off valve upon receiving a triggering sensor signal.

23 Claims, 2 Drawing Sheets

(56) References Cited

U.S. PATENT DOCUMENTS

| | | | |
|---|---|---|---|
| 6,032,921 A | | 3/2000 | Krepela |
| 6,169,953 B1 * | | 1/2001 | Panoushek ............. G01K 3/005 |
| | | | 123/198 D |
| 6,273,053 B1 | | 8/2001 | Krepela et al. |
| 6,276,328 B1 | | 8/2001 | Denton et al. |
| 6,478,011 B2 | | 11/2002 | Paffrath |
| 6,584,381 B2 | | 6/2003 | Gehrke |
| 6,647,328 B2 | | 11/2003 | Walker |
| 6,802,295 B2 | | 10/2004 | Bedwell et al. |
| 6,827,060 B2 | | 12/2004 | Huh |
| 6,837,474 B1 | | 1/2005 | DeJonge |
| 6,873,246 B1 | | 3/2005 | Ligoci et al. |
| 6,920,864 B1 | | 7/2005 | Roche et al. |
| 7,444,982 B2 * | | 11/2008 | Rivet ............................ 123/337 |
| 2003/0056754 A1 * | | 3/2003 | Prysko ........................... 123/394 |
| 2004/0083031 A1 * | | 4/2004 | Okezie ................... A61B 5/145 |
| | | | 701/1 |
| 2004/0118374 A1 * | | 6/2004 | Bedwell et al. .......... 123/198 D |
| 2006/0036358 A1 * | | 2/2006 | Hale ................... B60R 25/2009 |
| | | | 701/45 |
| 2007/0079793 A1 * | | 4/2007 | Cook ....................... F02D 17/04 |
| | | | 123/198 D |
| 2008/0077299 A1 * | | 3/2008 | Arshad ................ A01B 79/005 |
| | | | 701/50 |
| 2011/0090041 A1 * | | 4/2011 | Naden et al. ................... 340/3.1 |
| 2012/0196618 A1 * | | 8/2012 | Lowell et al. ............. 455/456.1 |
| 2013/0000730 A1 * | | 1/2013 | Johnson et al. .................. 137/1 |
| 2013/0285816 A1 * | | 10/2013 | Sezanayev ........... B60K 28/063 |
| | | | 340/576 |

\* cited by examiner

CONTROL METHOD AND SYSTEM FOR INTERNAL COMBUSTION ENGINE

CROSS REFERENCE TO RELATED APPLICATION

This application claims the priority benefit of U.S. Provisional Patent Application No. 61/684,368 filed on Aug. 17, 2012 entitled "Control Method and System for Internal Combustion Engine", the contents of which are incorporated herein by reference.

FIELD OF THE INVENTION

This invention relates to a control method and system for an internal combustion engine incorporating an engine shut-off valve, and in particular an air intake shut-off valve for a diesel or gasoline-fueled engine.

BACKGROUND OF THE INVENTION

In environments such as agriculture, mining, transportation, petrochemical drilling operations, pipeline facilities, fuel transfer facilities, or material processing plants, the atmosphere may become contaminated with airborne fuels due to leaks or spills. Airborne fuels constitute any readily vaporized, aerosolized or suspended particles of a combustible material or hydrocarbon. Exposure of an operating engine to airborne fuels is potentially hazardous, since an engine ingesting airborne fuels may run uncontrollably even if its normal fuel source is disabled, thus preventing the engine from being normally shut off. Continuous operation of the engine may trigger fires or explosions, or result in engine damage caused by improper fuel types or above-speed operation.

Compression-ignition or conventional diesel engines are particularly susceptible to this problem, since they trigger combustion by compression of the air fuel mixture in the cylinders rather than by application of a spark. In contrast to a spark-ignition engine, a compression ignition engine does not use a throttle valve to control intake air flow and engine speed; thus, intake air flow is typically unrestricted. Engine speed is normally controlled by adjusting the rate at which fuel is fed to the cylinders, and the engine is stopped by cutting off fuel flow. The engine can run on a wide variety of fuels including diesel, methane, natural gas, propane, gasoline, aviation fuel, aerosolized oil, $H_2S$, grain dust, metal dust and coal dust. The engine continues to run as long as it is provided with fuel and air. If the engine is exposed to an environment where fuel is supplied to the engine externally (other than through the engine's controlled fuel system), any positive control over the engine speed may be lost. Even if the operator attempts to shut off the engine by cutting off the flow of regular fuel, the engine may run uncontrollably on the external fuel source until it is damaged or fails, possibly triggering an explosion in the rich fuel-air environment.

Therefore, there is a need in the art for a method and system which mitigates these limitations.

SUMMARY OF THE INVENTION

The present invention relates to a control method and system for an internal combustion engine incorporating an engine shut-off valve, and in particular an air intake shut-off valve for a diesel or gas-fueled engine. The internal combustion engine may be any engine in a vehicle, or may comprise a heater which combusts a hydrocarbon, such as propane, gas or diesel powered heaters. A vehicle may have 2 or more engines, such a powertrain engine and a separate engine to operate pumps, generators or other equipment. The method and system may be used in worksites such as oil and gas drilling or production sites, or any worksite where airborne combustible material may be present.

In one aspect, the invention may comprise a control system for an internal combustion engine having an air-intake shut-off valve, the system comprising a valve controller unit (VCU) including a receiver capable of receiving a plurality of sensor signals, and a logic device capable of actuating the shut-off valve for permitting or preventing air flow to the engine, upon the VCU receiving a triggering sensor signal.

In one embodiment, the internal combustion engine is a compression ignition or a spark ignition engine.

In one embodiment, the VCU may be responsive to a sensor signal comprising a signal received from one or more of an engine sensor, a vehicle sensor, an environmental sensor, or an operator sensor. The engine sensor may transmit a signal indicative of an operating condition of the engine or an ancillary component of the engine. The at least one sensor signal comprises a signal indicative of one or more of the following: revolutions per minute, running time, oil pressure, coolant temperature, engine vibration, battery voltage or charging conditions. In one embodiment, the sensor signal comprises a vehicle accelerometer signal, or a signal indicative of biometric properties of an operator, or the intoxication level of an operator.

In one embodiment, the engine ancillary component may be an actuator selected from a warning horn, a light, an interlock mechanism, a pump controller, or a vehicle or engine control module capable of transmitting signals representative of operating conditions of the vehicle or engine to the VCU through a data bus.

In one embodiment, the VCU may be responsive to a manually transmitted signal, which may be transmitted from a control panel connected to the VCU, the control panel having display means providing visual or audible indicators for indicating whether the shut-off valve is open or closed. The control panel may be adapted to receive a voice command.

In one embodiment, the VCU may be responsive to a wireless signal transmitted by one or more zone transmitters. The system may comprise two or more zone transmitters, each have a coverage zone which is not coterminous with any other zone transmitter.

In one embodiment, the system may further comprise an outgoing data link for transceiving outbound or inbound command signals from or to the VCU, which may optionally encrypt and decrypt signals.

In one embodiment, the system may further comprise a GPS receiver connected to the VCU.

In one embodiment, the system may further comprise an audio or visual recording device connected to the VCU.

In another aspect, the invention provides a method of controlling an internal combustion engine having an air-intake shut-off valve using a control system as described herein.

In another aspect, the invention comprises a system for controlling at least one vehicle having a control system as described above in a worksite, said worksite divided into a plurality of zones, comprising a first zone transmitter associated with a first zone, and a second zone transmitter associated with a second zone, wherein the first zone transmitter does not reach the second zone, and the second zone transmitter does not reach the first zone, except for any overlapping areas, and wherein the control system of the at least one vehicle is responsive to signals from each zone transmitter to activate the air-intake shutoff valve.

In another aspect, the invention may comprise a method of controlling at least one vehicle having a control system as described above in a worksite divided into a plurality of zones, comprising the steps of:
 (a) providing a plurality of zone transmitters, each associated with a zone, and each adapted to send a valve-shutoff signal to a control system within its zone; and
 (b) activating one or more zone transmitters for a selected zone or zones.

Additional aspects and advantages of the present invention will be apparent in view of the description, which follows. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will now be described by way of an exemplary embodiment with reference to the accompanying simplified, diagrammatic, not-to-scale drawings. In the drawings.

DETAILED DESCRIPTION OF PREFERRED EMBODIMENTS

When describing the present invention, all terms not defined herein have their common art-recognized meanings. To the extent that the following description is of a specific embodiment or a particular use of the invention, it is intended to be illustrative only, and not limiting of the claimed invention. The following description is intended to cover all alternatives, modifications and equivalents that are included in the spirit and scope of the invention, as defined in the appended claims.

In one aspect, the present invention provides a control method and system for an internal combustion engine incorporating an engine shut-off valve, and in particular an air intake shut-off valve for a diesel or gas-fueled engine. Although the invention is described in the context of control of internal combustion engines operating in contaminated environments, it will be appreciated that the invention is equally applicable for control of engines operated in other environments related to safety and security; for example, the invention may force engine shutdown if oil pressure or cooling is lost, or a vehicle may be shutdown remotely, preventing it from being stolen or unintentionally operated.

The invention provides a control method and system for shutting down an engine which may be in an uncontrolled state. Shutdown may be achieved by transmitting manual or remote input signals to the engine. In one embodiment, the engine is shutdown by closing an air shut-off valve to starve the engine of any fuel-air mixture and stop the engine regardless of a continuous fuel supply or the presence of airborne fuels. The air shut-off valve may be closed immediately or gradually. Gradual shutdown may reduce uncombusted fuel fouling of the engine, enhance subsequent engine restarting, or limit the engine speed.

Figure 1:
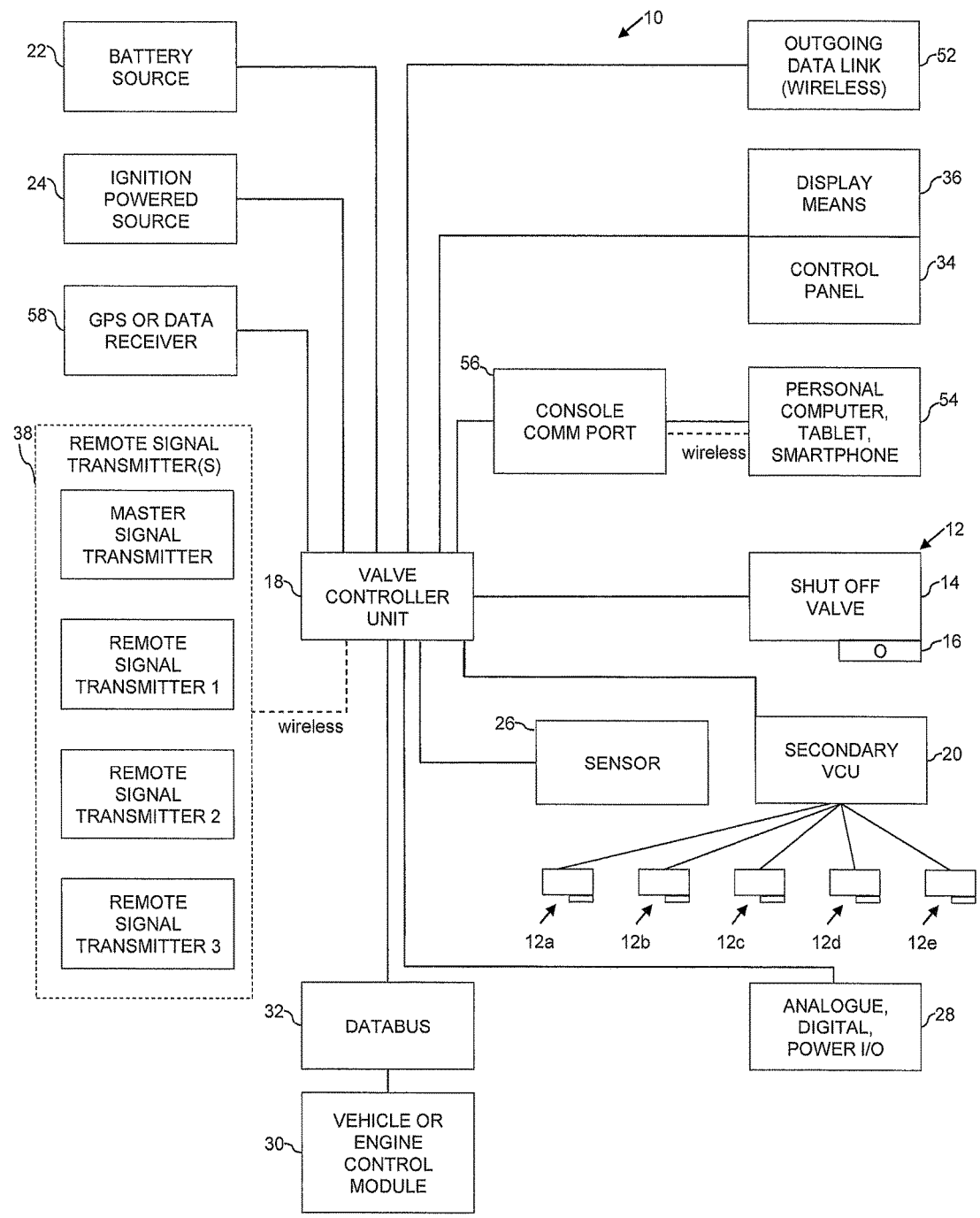
FIG. 1 is a schematic block diagram of the control system of one embodiment of the present invention.

The system (10) is generally shown schematically in FIG. 1. A shut-off valve (12) for the air intake of the engine is comprised of a housing (14) defining an air flow passage (16). A control valve (not shown) is disposed in the air flow passage (16) and is moveable between a first open position which permits the flow of air through the air flow passage (16), and a second closed position which prevents air flow through the air flow passage (16). A shut-off valve (12) for use with the present invention is described, for example, in U.S. Pat. No. 7,444,982 to Rivet, the contents of which are incorporated herein by reference, where permitted, although other flow control valves as would be used by those skilled in the art may be suitable.

The shut-off valve (12) is operatively linked to a valve controller unit (18). The valve controller unit (18) comprises components for monitoring and controlling the shut-off valve (12). Such components include, but are not limited to, a valve motor driver, a receiver capable of receiving command signals, and diagnostic and control features. The valve controller unit (18) may comprise components combined in a single unit or as multiple, distinct units.

The valve controller unit (18) may be a primary control unit connected to a secondary valve controller unit (20), which in turn directly controls multiple valves (12a to 12e). Alternatively, the valve controller unit (18) may directly control a plurality of valves (12), independently or in unison.

One or more power sources provide operating power to the valve controller unit (18). Suitable power sources include, but are not limited to, a non-ignition battery source (22) or an ignition-powered source (24) connected to the valve controller unit (18). For example, the VCU may be directly connected to the vehicle battery. Provision of operating power simultaneously from both sources (22, 24) is advantageous in several situations. For example, this configuration enables a controlled power down where a user may accidentally shut off the vehicle ignition before the shut-off valve (12) is fully closed. Further, engine and system monitoring, diagnostic and event logging, and remotely activated functions remain operable after the ignition has been turned off. A separate or backup power source may be useful if the vehicle battery fails.

The valve controller unit (18) may be responsive to an operating condition of the engine, an operating condition of an ancillary component of the engine, a manually or automatically transmitted signal, or a remotely transmitted signal to produce an output signal to control the opening and closing of the shut-off valve (12). The valve controller unit (18) comprises a logic device which processes the incoming signal, and in the appropriate circumstances, generates an output signal to control the shut-off valve (12). The valve controller unit (18) may comprise a memory in which program information and/or various data can be stored and accessed by the logic device.

In one embodiment, the valve controller unit (18) may be responsive to an operating condition of the engine, which may include temperature, pressure or revolutions per minute ("RPM"). Closure of the shut-off valve (i.e., shutdown of the engine) is thus driven by one or more pre-programmed thresholds of an operating condition of the engine, for example, RPM reaching a pre-specified maximum or the engine temperature exceeding a pre-specified maximum. In one embodiment, the valve controller unit (18) may be responsive to an operating condition of an ancillary component of the engine, such as the electrical system. The engine may be instrumented with one or more sensors (26) through analogue, digital and power capable interface ports (28).

In one embodiment, the valve controller unit (18) may be responsive to various types of sensors (26) other than engine sensors, such as vehicle sensors, environmental sensors (for example, a toxic gas monitor), and operator sensors. The sensors (26) detect a parameter or variable of interest and generate signals representative of the parameter or variable. The signals are then transmitted to the valve controller unit (18) which produces an output signal to the shut-off valve (12). Closure of the shut-off valve (12) (i.e., shutdown of the engine) is thus driven by pre-programmed thresholds of physical quantities detected by the sensors (26); for instance: time (for example, operation of the engine past a set time limit; input logic triggers (for example, inputs "1" and "2" representing "logically high" and input "3" as logically low); or a combination of threshold and time driven triggers (for example, the voltage being too high for too long).

In one embodiment, one or more sensors (26) detect the rotational speed of the engine. Suitable sensors (26) include, for example, a tachometer probe mounted in the engine on the fly-wheel; a magnetic pickup positioned on the vehicle alternator; an alternator ripple voltage or ripple current detector; and a rotational speed reading generated by an engine or vehicle management computer system.

In one embodiment, one or more sensors (26) may detect engine conditions including, for example, running time, oil pressure, coolant temperature, vibration, battery voltage and charging conditions. Engine functions may be detected directly, remotely, or through analogue or digital means (for example, amplitude, polarity, frequency, state, edge detection, period, duty factor or data buses to provide digitally represented parameters).

In one embodiment, the sensors (26) may comprise vehicle sensors such as accelerometers which detect inclination, vibration and/or shock which may be encountered with vehicle collision or failure, and generate signals to actuate the system (10) or broadcast an emergency message to a central monitoring station. The accelerometers may also be used to detect if the vehicle is running at an inclination that exceeds a threshold, which may indicate the vehicle is disabled or overturned.

In one embodiment, the sensors (26) may comprise operator sensors such as breathalyzers that detect the blood alcohol or drug level of the vehicle operator. The valve controller unit (18) may for example produce an output signal to actuate the shut-off valve (12) if the level detected by the sensor (26) exceeds an intoxication limit. In one embodiment, the sensors (26) are biometric devices such as voice print analyzers, retinal scanners, or fingerprint scanners, that detect uniquely identifying characteristics of the operator. The valve controller unit (18) may produce an output signal to actuate the shut-off valve (12) depending on whether the sensor (26) detects a recognized or unrecognized operator. The valve controller unit (18) may also activate an alarm or send a message to selected recipients.

In one embodiment, one or more actuators (not shown) are provided. Non-limiting examples of actuators include warning horns, lights, interlock mechanisms, pump controllers or the like, such that the system (10) may conduct simple process control, safety interlock and warning duties.

In one embodiment, a vehicle or engine control module (30) transmits signals representative of the operating conditions of the vehicle or engine to the valve controller unit (18) through a data bus (32). The engine control module may, for example, transmit data pertaining to engine operating conditions and diagnostic codes related to engine malfunctions. For example, the vehicle control module (30) may, for example, transmit data pertaining to tire pressure, braking systems, or remote trailer valve controller units using the OBD-II, CAN bus or J-bus.

In one embodiment, the valve controller unit (18) may also be responsive to a manual signal. In one embodiment, the signals may be transmitted manually using a control panel (34) connected to the valve controller unit (18), allowing the user to alter or program parameters for triggering the valve controller unit (18) or to press a shut-off button. In one embodiment, the control panel (34) may comprise an input module for speech recognition, allowing the user to control the valve controller unit (18) using voice commands such as "Shut down." In one embodiment, the control panel (34) comprises a keypad device for receiving a manually input security code. In one embodiment, display means (36), which are either connected to or integral with the control panel (34), display visual or emit audible indication signals (for example, system status, errors, alarms, output messages, instructions, audible buzzers) to inform a user whether the shut-off valve (12) is opened or closed. For example, the display means (36) may playback an audible warning "Shutdown pending." The display means (36) may permit two-way communication between the operator and a second person. For example, the display means (36) may comprise an intercom for audio conversation with the operator and a display screen for showing text or visual messages or alarms.

The manual signal may be received wirelessly from a remote location or from one or more remote signal transmitters (38). In one embodiment, remote signal transmitters (38) transmit signals to the valve controller unit (18). The transmitted signals comprise wireless transmission (for example, radio frequency including keyed-CW, AM, FM, FSK or other data modulating modes). In one embodiment, the remote signal transmitter (38) is portable. In one embodiment, the transmitter (38) may be used in a key fob type configuration to transmit short range signals to the valve controller unit (18) to produce a signal to open or close the shut-off valve (12). The key type configuration may be "ID code locked" to prevent the address from being changed, or provided with an ID code randomizer to allow new codes to be generated. In one embodiment, the transmitter (38) is an electronic badge carried or worn by an operator in close proximity to the valve controller unit (18) that emits a signal containing information about the operator's identity and authorization to operate the engine.

In one embodiment, the remote signal transmitter (38) is a master signal transmitter capable of transmitting long range signals that may be incorporated with the system (10). The master signal transmitter may serve as a central station which communicates with one or more zone transmitters to trigger immediate or delayed shutdown of one or more engines within a zone. The master signal transmitter may transmit signals repeatedly to ensure that all engines within or entering the zone receive the signals, particularly in adverse or noisy radio frequency environments.

Figure 2:
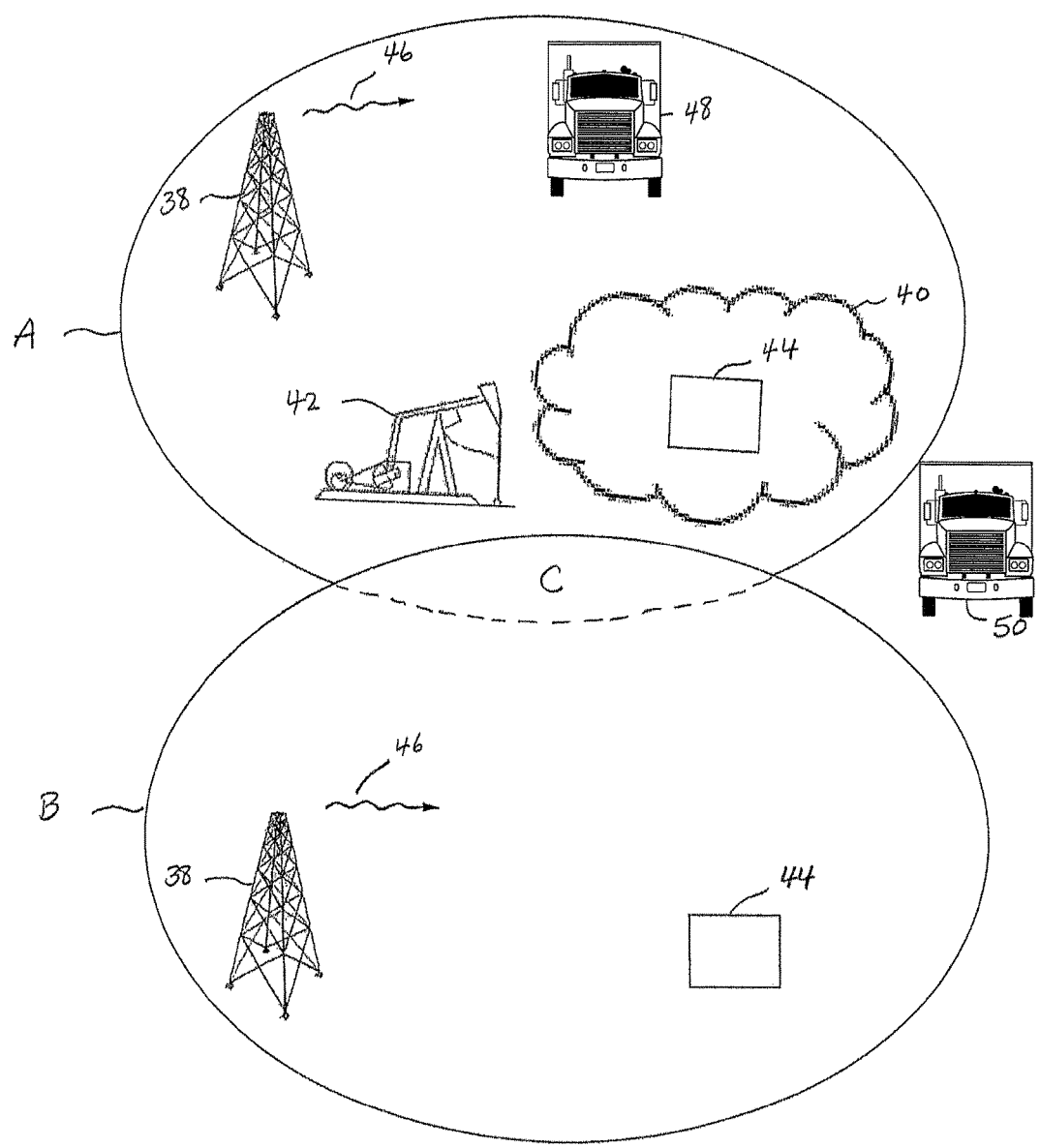
FIG. 2 is a schematic diagram showing use of multiple control systems of FIG. 1 in a field installation.

Overlapping or non-overlapping reception zones for the zone transmitters allow the partitioning of work sites into smaller physical regions so that shutdown or other command signals can be delivered to one or more selected engines or other equipment adapted to receive such signals. In the situation rendering as shown in FIG. 2, there are two reception zones (designated as "A" and "B") which overlap but are not co-terminous, each having a fixed transmission radius. If the atmosphere in Zone A has become contaminated with airborne fuels (40) due to a spill from a wellhead (42), then the zone transmitter (38) transmits a radio signal (46) to a vehicle (48) within the transmission radius of Zone A. The transmitted radio signal (46) is received by the vehicle (48) of which the operator is alerted of imminent shutdown, and the engine is triggered for delayed or gradual shutdown. Since Zone B is uncontaminated by the airborne combustibles (40), the engine (44) in Zone B continues to operate. The overlapping zone (designated as "C") extends coverage around Zone A to provide a buffer distance for vehicles attempting entry into the affected zone. The vehicle (50) positioned outside the transmission radii of Zones A, B and C is unaffected by the transmitted radio signals (46).

Multiple transmitters may allow immediate and delayed or gradual shutdown on different engines. For example, a first transmitter could signal immediate shutdown of stationary engines, while a second transmitter could signal delayed shutdown of mobile engines. This configuration would be needed with emergency vehicles or equipment (for example, police cars, medical emergency vehicles, ambulances, fire trucks) required to remain operable within the affected zone. The probability of message collisions between multiple or simultaneously emitting transmitters operating on the same frequency allocation may be reduced by introducing random variations in the repeated transmission interval.

The system (10) may provide security encoded bit, nibble, byte and block level error correction on received key-fob, zone and master transmitted data. The wireless signals may be encrypted by methods known in the art, including dynamic encryption protocols.

In one embodiment, an outgoing data link (for example, a wireless link) (52) may deliver messages to a user who can send a scripted message back to a monitoring station or to a mobile communication device such as a cellular phone. The outbound wireless signals may comprise electronic data for audio or visual display, and may be encrypted for security, including using dynamic encryption protocols. In one embodiment, an outgoing data link (52) may be used to transmit outbound signals to notify a monitoring station or mobile communication device of engine shutdown. In one embodiment, the valve controller unit (18) serves as a communication hub for other valve controller units. For example, upon a shut down event, a valve controller unit (18) may cause the outgoing data link (52) to transmit wireless signals to other valve controller units of other vehicles to actuate their respective shut-off valves. In one embodiment, the valve controller unit (18), in response to receiving a "man down" event related to the injury of an operator, may deliver a message to a monitoring station or an emergency medical service. Conversely, for inbound signals to the system (10) from a remote control station, the system (10) may simultaneously shutdown the equipment and advise nearby personnel to evacuate the area.

Optionally, an external personal computer (54), such as a laptop computer, a tablet computer, or a smart phone, may be temporarily or permanently connected to the valve controller unit (18) through a console communication port (56), or through a wireless communication protocol. The external personal computer (54) sets, reads and/or monitors the configuration, programming, operation and messages from the valve controller unit (18). Firmware updates may be conducted through the console communication port (56). The communication port (56) may comprise a wired connection, or a wireless connection using electronic protocols or networks such as Ethernet, Wi-Fi, Bluetooth™, GSM and GPS-AVL satellite. In one embodiment, the remote signal transmitter (38) may comprise an external personal computer (54).

Optionally, an engine management computer or vehicle management computer interface (not shown) may be provided. This connection from the system (10) to the engine's or vehicle's management system may be provided so that the system (10) can be integrated with the engine or vehicle to provide more advanced functions such as responding to engine errors, vehicle operating information or similar tasks.

Optionally, the system (10) may be connected to a GPS or data receiver (58) (for example, an incoming or bi-direction wireless communication sub-system such as an AVL-GPS unit) to provide geo-fencing, security monitoring, and asset tracking and management. Incoming wireless communication sub-systems include, but are not limited to, cell phone connections, wireless LAN systems, SCADA systems, satellite modems or other such communication systems as are known to the art.

The system (10) may incorporate monitoring and diagnostic features to ensure proper operation, recordal of events, and maintenance. Examples of such features include, but are not limited to, on-board scheduled monitoring and diagnostics of a) hardware and system status, such as memory tests, program and data checksums, sub-system monitoring (system voltages, internal battery states, COP/Watchdogs, etc.); b) attached peripherals to ensure the integrity of input and output ports, and communication channels; and c) low battery detection on key fob and other battery operated remote transmitters.

Features for recording events or maintenance include, but are not limited to, event logging with real time clock for data time stamping, alarm functions, and other supervisory functions; logging of the source of shutdown commands including the transmitting station ID if shutdown by a remote transmitter, so that event reconstruction, diagnostics and forensics can be performed; and logging of system configuration changes to track the system configuration history and the identity of the entity performing the configuration changes.

The aforementioned monitoring and diagnostic functionality may be implemented at a physical gate or checkpoint. For example, a transceiver situated at a checkpoint location may transmit a signal to the valve controller unit (18). In response to such a signal, the valve controller unit (18) may actuate the shut-off valve if, for example, the vehicle is not permitted to pass through the checkpoint location, the vehicle's shutdown history is abnormal, or the vehicle has arrived prematurely at the checkpoint.

An audio or video recording device may be also connected to the valve controller unit to record activities within or outside the truck area. The recorded information may be subsequently retrieved for review, or transmitted via the outgoing data link (52) for live monitoring. For example, a video camera may be used for security purposes to monitor unauthorized operation. If such unauthorized operation is detected via police or security monitoring, a signal may be sent to the valve controller unit (18) via a remote signal transmitter to actuate the shut-off valve (12).

As will be apparent to those skilled in the art, various modifications, adaptations and variations of the foregoing specific disclosure can be made without departing from the scope of the invention claimed herein.

What is claimed is:

1. A control system for an internal combustion engine having an air-intake shut-off valve, the system comprising a valve controller unit (VCU) including a receiver adapted to receive a sensor signal, a logic device capable of actuating the shut-off valve for permitting or preventing air flow to the engine, upon the VCU receiving a triggering sensor signal, and a data link for transmitting an outbound wireless signal from the VCU, wherein the VCU causes the data link to transmit the outbound wireless signal upon the VCU receiving the triggering sensor signal, and wherein the outbound wireless signal comprises either one or both of:

another triggering sensor signal for another VCU associated with another internal combustion engine to actuate another air-intake shut-off valve associated with the another internal combustion engine; or electronic data for audio or visual display of a message by a monitoring station or a mobile communication device that the engine is shut down.

2. The system of claim 1, wherein the internal combustion engine is a compression ignition or a spark ignition engine.

3. The system of claim 2, wherein the internal combustion engine is a compression ignition engine.

4. The system of claim 1, wherein the VCU is responsive to a wireless signal transmitted by a zone transmitter in a system comprising a worksite having two or more zone transmitters, each having a coverage zone within the worksite which is not coterminous with the coverage zone of any other zone transmitter.

5. The system of claim 1, further comprising an engine management computer or vehicle management computer interface operatively connected to the VCU.

6. The system of claim 1, further comprising a GPS receiver connected to the VCU.

7. The system of claim 1, further comprising an audio or visual recording device connected to the VCU.

8. A system for controlling at least one vehicle having a control system for an internal combustion engine having a shut-off valve in a worksite, divided into a plurality of zones, comprising a first zone transmitter associated with a first zone, and a second zone transmitter associated with a second zone, wherein the first zone transmitter does not reach the second zone, and the second zone transmitter does not reach the first zone, except for any overlapping areas, and wherein the control system of the at least one vehicle is responsive to signals from each zone transmitter to activate the air-intake shutoff valve.

9. A method of controlling at least one vehicle having a control system for an internal combustion engine having a shut-off valve in a worksite divided into a plurality of zones, comprising the steps of:

(a) providing a plurality of zone transmitters, each associated with a zone, and each adapted to send a valve-shutoff signal to a control system within its zone; and (b) activating one or more zone transmitters for a selected zone or zones.

10. The system of claim 1, wherein the triggering sensor signal comprises a signal received from one or more of an engine sensor, a vehicle sensor, an environmental sensor, or an operator sensor.

11. The system of claim 10, wherein the triggering sensor signal is indicative of an operating condition of the engine or an ancillary component of the engine.

12. The system of claim 11, wherein the triggering sensor signal comprises a signal indicative of one or more of the following: revolutions per minute, running time, oil pressure, coolant temperature, engine vibration, battery voltage or charging conditions.

13. The system of claim 10, wherein the triggering sensor signal comprises a vehicle accelerometer signal.

14. The system of claim 10, wherein the sensor detects biometric properties of an operator.

15. The system of claim 10, wherein the sensor detects the intoxication level of an operator.

16. The system of claim 11, wherein the ancillary component is an actuator selected from a warning horn, a light, an interlock mechanism, or a pump controller.

17. The system of claim 11, wherein the ancillary component is a vehicle or engine control module capable of transmitting signals representative of operating conditions of the vehicle or engine to the VCU through a data bus.

18. The system of claim 1, further comprising a control panel connected to the VCU and having means for receiving a manual input for generating the triggering sensor signal.

19. The system of claim 18, wherein the control panel comprises display means providing visual or audible indicators for indicating whether the shut-off valve is open or closed.

20. The system of claim 1, further comprising a control panel is adapted to receive a voice command for generating the triggering sensor signal.

21. The system of claim 1, wherein the outbound wireless signal comprises the another triggering sensor signal for another VCU associated with another internal combustion engine to actuate another air-intake shut-off valve associated with the another internal combustion engine.

22. The system of claim 1, wherein the outbound wireless signal comprises the electronic data for an audio or visual message by a monitoring station or a mobile communication device that the engine is shut down.

23. A control system for an internal combustion engine having an air-intake shut-off valve, the system comprising a valve controller unit (VCU) including a receiver adapted to receive a sensor signal, and a logic device capable of actuating the shut-off valve for permitting or preventing air flow to the engine, upon the VCU receiving a triggering sensor signal, wherein the VCU is responsive to a wireless signal transmitted by a zone transmitter in a system comprising a worksite having two or more zone transmitters, each having a coverage zone within the worksite which is not coterminous with the coverage zone of any other zone transmitter.

* * * * *